US009380124B2

(12) United States Patent
Tuubel et al.

(10) Patent No.: US 9,380,124 B2
(45) Date of Patent: *Jun. 28, 2016

(54) DETECTION OF COMMUNICATION STATES

(71) Applicant: Skype, Dublin (IE)

(72) Inventors: Tauri Tuubel, Tallinn (EE); Liz Rice, Enfield (GB); Stuart John, Santa Monica, CA (US); Teet Konnussaar, Tallinn (EE); Jill Tolan, Hertfordshire (GB)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,246

(22) Filed: Mar. 11, 2015

(65) Prior Publication Data
US 2015/0189029 A1 Jul. 2, 2015

Related U.S. Application Data

(63) Continuation of application No. 12/006,093, filed on Dec. 28, 2007, now Pat. No. 9,032,030.

(30) Foreign Application Priority Data

Mar. 28, 2007 (GB) .................................. 0706074.2

(51) Int. Cl.
*H04L 29/08* (2006.01)
*H04L 12/58* (2006.01)
*H04L 12/18* (2006.01)
(52) U.S. Cl.
CPC ............ *H04L 67/24* (2013.01); *H04L 12/5815* (2013.01); *H04L 51/043* (2013.01); *H04L 67/1095* (2013.01); *H04L 12/18* (2013.01)
(58) Field of Classification Search
CPC combination set(s) only.
See application file for complete search history.

(56) References Cited

U.S. PATENT DOCUMENTS 6,697,840 B1    2/2004  Godefroid et al.
7,796,592 B2    9/2010  Stafford et al.
(Continued)

FOREIGN PATENT DOCUMENTS

CN    101675649    3/2010
EP    1441486      7/2004
(Continued)

OTHER PUBLICATIONS

"Final Office Action", U.S. Appl. No. 12/006,093, Apr. 18, 2014, 22 pages.
(Continued)

*Primary Examiner* — Abdullahi E Salad
(74) *Attorney, Agent, or Firm* — Tong Wong; Micky Minhas

(57) ABSTRACT

A method of determining an overall presence state for a user of a communication system in which the user is connected to the communication system using a plurality of devices. The method includes each of the plurality of devices storing in a device memory a presence state for that device; detecting a change in the presence state in at least one of the plurality of devices; each of the plurality of devices transmitting a message via the communication system to the remainder of the plurality of devices, the message comprising the presence state; receiving the messages at the remainder of the plurality of devices; and executing a decision-making code sequence in a processor at each of the remainder of the plurality of devices to determine whether to synchronize the presence state of that device with the presence state from one of the messages based on the origin of an event causing the change in presence state at the at least one of the plurality of devices.

20 Claims, 10 Drawing Sheets

(56) References Cited

U.S. PATENT DOCUMENTS

| | | |
|---|---|---|
| 7,958,212 B1 | 6/2011 | Wong et al. |
| 9,032,030 B2 | 5/2015 | Tuubel et al. |
| 2003/0217142 A1 | 11/2003 | Bobde et al. |
| 2004/0003037 A1* | 1/2004 | Fujimoto ............. G06Q 10/107 709/203 |
| 2004/0122901 A1 | 6/2004 | Sylvain |
| 2004/0153506 A1* | 8/2004 | Ito ........................... H04L 67/24 709/204 |
| 2007/0233875 A1 | 10/2007 | Raghav et al. |
| 2008/0027996 A1 | 1/2008 | Morris |
| 2008/0148154 A1 | 6/2008 | Burrell et al. |
| 2008/0291896 A1 | 11/2008 | Tuubel et al. |
| 2009/0009343 A1* | 1/2009 | Boyer ................... H04L 12/581 340/573.1 |
| 2009/0282147 A1 | 11/2009 | Morris |

FOREIGN PATENT DOCUMENTS

| | | |
|---|---|---|
| JP | 2004030371 | 1/2004 |
| JP | 2004228833 | 3/2004 |
| WO | WO-2005009019 | 1/2005 |
| WO | WO-2007136430 | 11/2007 |
| WO | WO-2008117116 | 10/2008 |

OTHER PUBLICATIONS

"Final Office Action", U.S. Appl. No. 12/006,093, Jun. 7, 2012, 16 pages.

"Foreign Office Action", AU Application No. 2007350155, Mar. 8, 2011, 2 pages.

"Foreign Office Action", AU Application No. 2007350155, Aug. 4, 2010, 3 pages.

"Foreign Office Action", CA Application No. 2682104, Dec. 9, 2014, 3 pages.

"Foreign Office Action", CN Application No. 200780053011.4, Mar. 15, 2012, 22 pages.

"Foreign Office Action", JP Application No. 2010-500373, Mar. 23, 2012, 6 pages.

"International Search Report and Written Opinion", Application No. PCT/IB2007/004511, Jan. 20, 2009, 10 pages.

"Non-Final Office Action", U.S. Appl. No. 12/006,093, Oct. 10, 2013, 20 pages.

"Non-Final Office Action", U.S. Appl. No. 12/006,093, Feb. 14, 2012, 10 pages.

"Notice of Allowance", U.S. Appl. No. 12/006,093, Dec. 4, 2014, 16 pages.

* cited by examiner

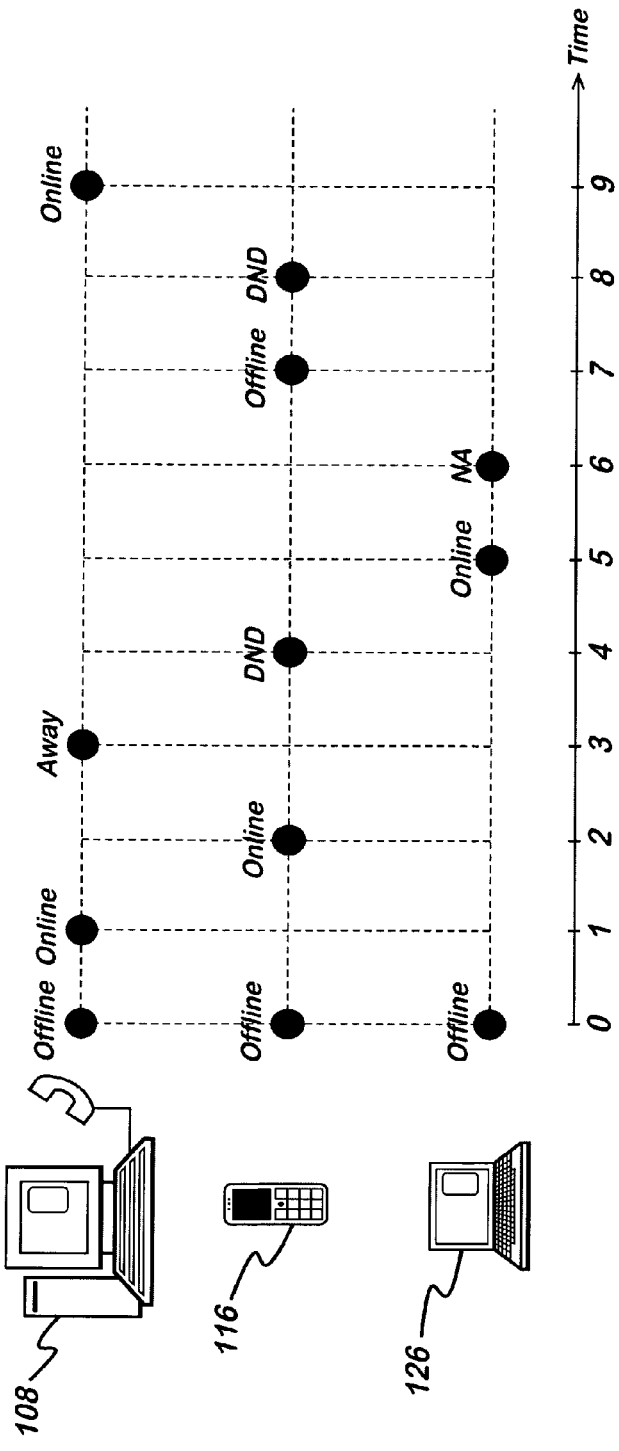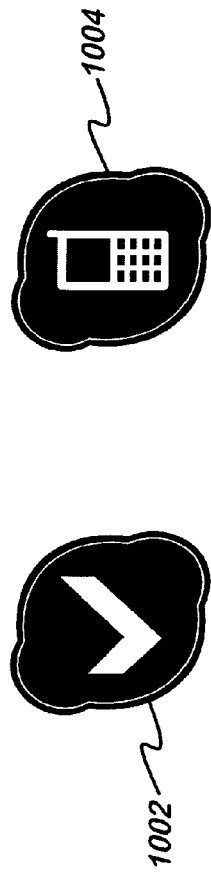

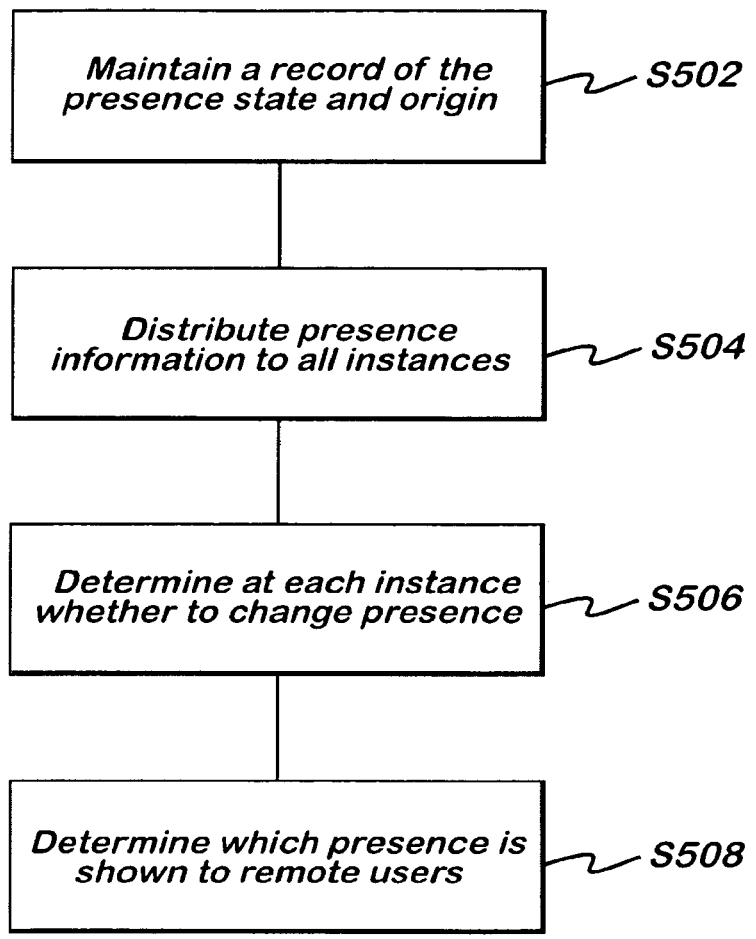

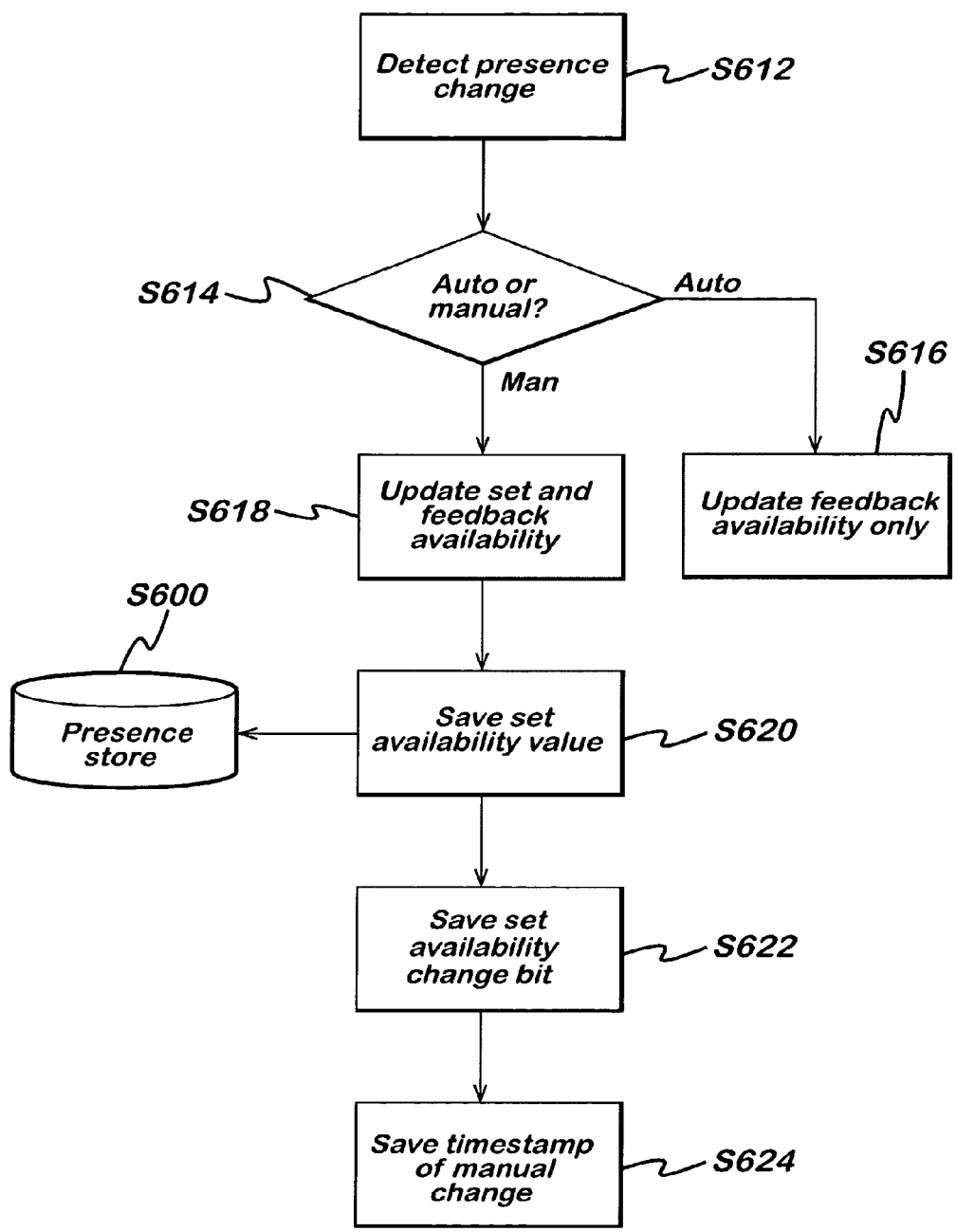

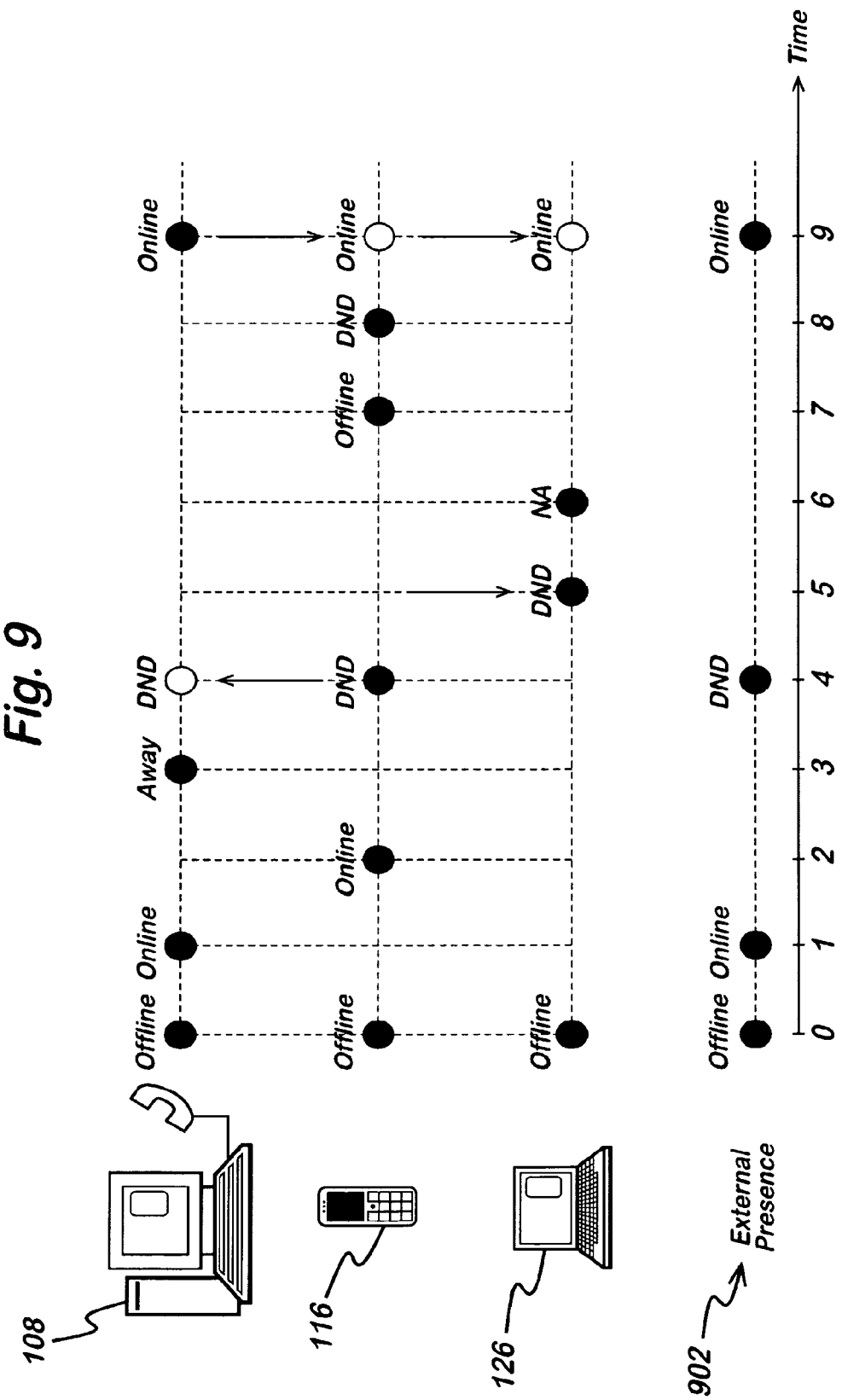

DETECTION OF COMMUNICATION STATES

RELATED APPLICATION

This application is a continuation of and claims priority to U.S. patent application Ser. No. 12/006,093 filed Dec. 28, 2007. U.S. patent application Ser. No. 12/006,093 claims priority under 35 U.S.C. §119 or 365 to Great Britain, Application No. 0706074.2, filed Mar. 28, 2007. The disclosures of the above applications are incorporated herein by reference in their entirety.

BACKGROUND

Voice over internet protocol ("VoIP") communication systems allow the user of a device, such as a personal computer, to make telephone calls across a computer network such as the Internet. These systems are beneficial to the user as they are often of significantly lower cost than traditional telephony networks, such as fixed line or mobile networks. This may particularly be the case for long distance calls. To use a VoIP service, the user must install and execute client software on their device. The client software provides the VoIP connections as well as other functions such as registration and authentication. In addition to voice communication, the client may also provide video calling and instant messaging ("IM").

One type of VoIP communication system uses a peer-to-peer ("P2P") network topology built on proprietary protocols. An example of this type of communication system is the Skype™ system. To access the peer-to-peer network, the user must execute P2P client software provided by the operator of the P2P system on their user terminal, and register with the P2P system. When the user registers with the P2P system the client software is provided with a digital certificate from a central server. Once the client software has been provided with the certificate communication can subsequently be set up and routed between users of the P2P system without the further use of a central server. In particular, the users can establish their own communication routes through the P2P system based on exchange of one or more digital certificates (or user identity certificates, "UIC") to acquire access to the P2P system. The exchange of the digital certificates between users provides proof of the user's identities and that they are suitably authorised and authenticated in the P2P system. Therefore, the presentation of digital certificates provides trust in the identity of the user. It is therefore a characteristic of peer-to-peer communication that the communication is not routed using a central server but directly from end-user to end-user. Further details on such a P2P system are disclosed in WO 2005/009019.

One of the advantages of VoIP communication systems, compared to traditional telephony services provided over the public switched telephone network ("PSTN"), is that presence information can be provided for the users. Presence information is an indication of the current status of a user of the system. More specifically, presence information is displayed in the user interface of the client for each of the contacts that the user has stored, and allows the user to view the current status of the contacts in the system. Example presence states that may be displayed include (but are not limited to) "online", "offline", "away", "not available" and "do not disturb".

The use of presence states provides a user with prior knowledge of the current state of a contact before attempting to communicate with the contact. For example, if the user is not online, and therefore unable to be contacted, then this is clear to the user before attempting to make a call. Similarly, if a contact is busy and unlikely to answer, then this is also communicated in advance via the presence state. This is a considerable advantage over PSTN telephony systems, which do not provide any prior information on the state of a user. The only option in PSTN telephony is to dial a number and wait and see if it is answered.

SUMMARY

However, a problem exists in a scenario in which a user of the VoIP communication system uses several different devices to access the VoIP communication system. For example, the user can use a combination of a personal computer ("PC"), personal digital assistant ("PDA"), a mobile phone, a gaming device or other embedded device to connect to the VoIP communication system. The user may use several of these devices to connect to the VoIP communication system simultaneously. Furthermore, the user may also connect to the VoIP system from a number of different locations, and these devices may remain connected, even after the user has finished using them. For example, a user may connect to the VoIP communication system from a home PC, and then subsequently connect to the VoIP communication system from an office PC without first disconnecting the home PC.

The problem arises because each of these devices may show a different presence for the user. Therefore, the presence for the user that is displayed to other users of the VoIP system depends largely on which one of the several devices has reported its presence, rather than reflecting the actual status of the user.

There is therefore a need for a technique to address the aforementioned problems with presence information over multiple devices.

According to one aspect of the present invention there is provided a method of determining an overall presence state for a user of a communication system in which the user is connected to the communication system using a plurality of devices, the method comprising: each of the plurality of devices storing in a device memory a presence state for that device; detecting a change in the presence state in at least one of said plurality of devices; each of said plurality of devices transmitting a message via the communication system to the remainder of said plurality of devices, said message comprising the presence state; receiving said messages at the remainder of said plurality of devices; and executing a decision-making code sequence in a processor at each of said remainder of said plurality of devices to determine whether to synchronise the presence state of that device with the presence state from one of said messages based on the origin of an event causing the change in presence state at said at least one of said plurality of devices.

According to another aspect of the present invention there is provided a system for determining an overall presence state for a user of a communication system in which the user is connected to the communication system using a plurality of devices, comprising: means for storing in a device memory in each of the plurality of devices a presence state for that device; means for detecting a change in the presence state in at least one of said plurality of devices; means for transmitting, from each of said plurality of devices, a message via the communication system to the remainder of said plurality of devices, said message comprising the presence state; means for receiving said messages at the remainder of said plurality of devices; and means for executing a decision-making code sequence in a processor at each of said remainder of said plurality of devices to determine whether to synchronise the presence state of that device with the presence state from one of said messages based on the origin of an event causing the change in presence state at said at least one of said plurality of devices.

BRIEF DESCRIPTION OF THE DRAWINGS

For a better understanding of the present invention and to show how the same may be put into effect, reference will now be made, by way of example, to the following drawings in which:

FIG. 4 shows an example scenario with three user devices having different presence states;

FIG. 5 shows a flowchart to determine a single presence state for a user with multiple devices;

FIG. 6A shows a flowchart for maintaining presence information at log-in;

FIG. 6B shows a flowchart for maintaining presence information following a presence change;

FIG. 9 shows the example scenario of FIG. 4 with the technique to manage multiple presence states; and FIG. 10 shows presence indicator icons.

DETAILED DESCRIPTION

Figure 1:
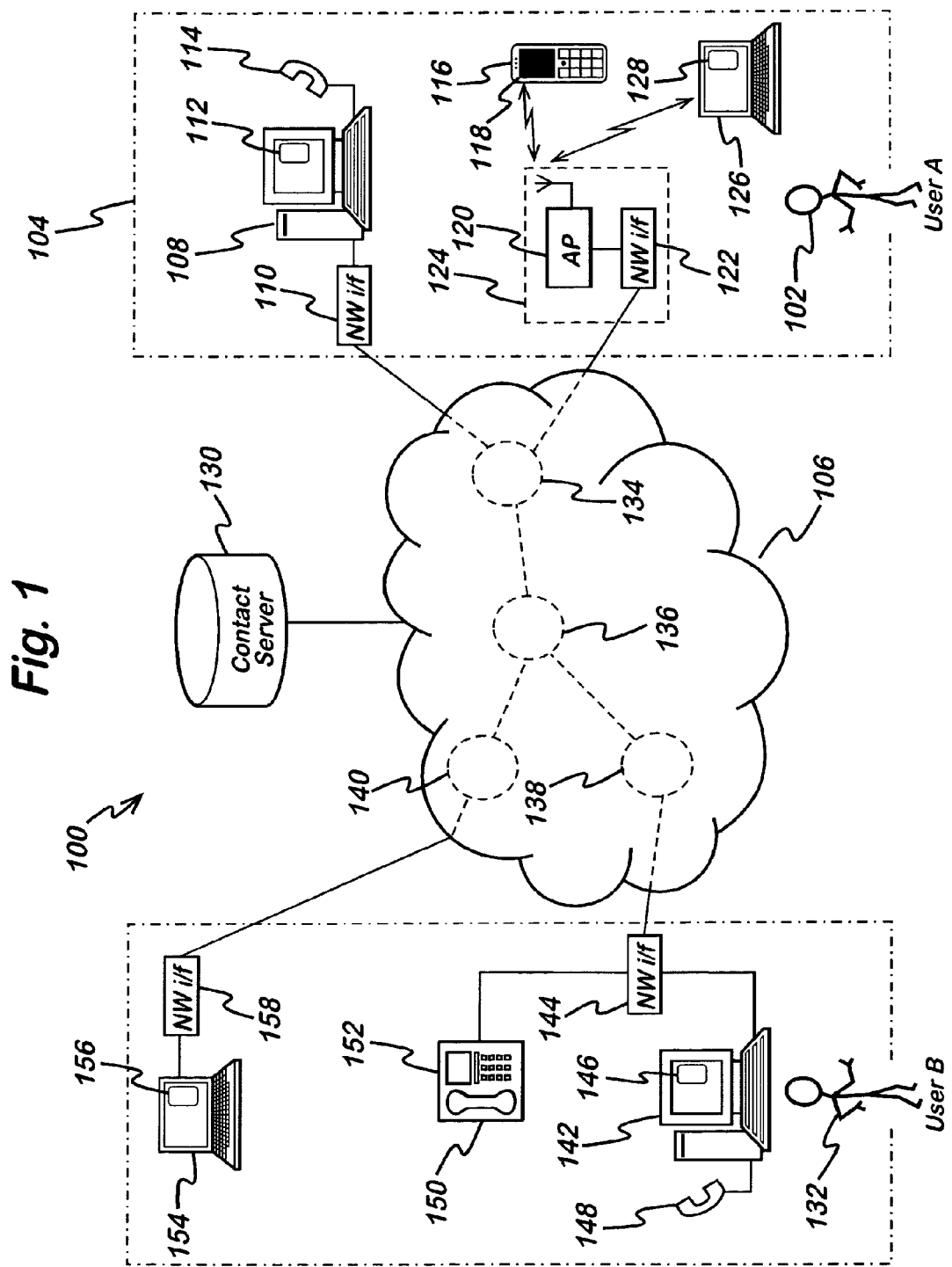
FIG. 1 shows a VoIP system in which users operate a plurality of devices.

Reference is first made to FIG. 1, which illustrates a VoIP communication system 100 in which users communicate using multiple devices. In the embodiment shown in FIG. 1, a P2P communication system is illustrated, although it will be understood that other forms of communication could also be used.

A first user of the P2P communication system (denoted "User A" 102) operates a plurality of user devices, indicated generally at 104. All of these user devices are connected to a network 106, such as the Internet. The user devices 104 can include, for example, a personal computer ("PC") (either desktop or laptop), personal digital assistant ("PDA"), a mobile phone, an embedded VoIP device (wireless or corded); a gaming device or any other suitable device able to connect to the network 106.

In the example shown in FIG. 1, User A 102 has three devices. The first is a desktop PC 108. User A interacts with desktop PC 108 via a display screen and a keyboard and mouse. The desktop PC 108 is connected to the network 106 via a network interface 110 such as a modem, and the connection between the desktop PC 108 and the network interface 110 may be via a cable (wired) connection or a wireless connection.

The desktop PC 108 is running a client 112, provided by the operator of the peer-to-peer communication system. The client 112 is a software program executed on a local processor in the desktop PC 108. The desktop PC 108 is also connected to a handset 114, which comprises a speaker and microphone to enable the user to listen and speak in a voice call in the same manner as with traditional fixed-line telephony. The handset 114 does not necessarily have to be in the form of a traditional telephone handset, but can be in the form of a headphone or earphone with an integrated microphone, or as a separate loudspeaker and microphone independently connected to the desktop PC 108.

The second example device of User A is a mobile phone 116 with an embedded client 118 that allows the mobile phone 116 to connect to the VoIP system. The mobile phone 116 can be a wifi phone, which uses a wifi wireless local area network (IEEE 802.11) connection to connect to an access point ("AP") 120. The AP 120 connects to the network 106 via a network interface 122, such as a modem. In some embodiments, the AP 120 and network interface 122 may be integrated into a single device 124. In alternative embodiments, the mobile phone can be a cellular phone running an embedded or downloaded client application.

The wifi phone 116 acts as a stand-alone device for connecting to the VoIP and making calls. As well as embedded client software 118 running on a local processor in the device, the wifi phone 116 has a display, keyboard, microphone and speaker integrated into the device to enable calls to be made over the VoIP system.

The third example device of User A's is a laptop 126. In the example shown in FIG. 1, the laptop 126 communicates using wifi with the AP 120, and connects to the network 106 via network interface 122. In alternative embodiments, the laptop 126 could connect to a network interface using a wired connection. Executed on a local processor of the laptop is a client 128, which is similar to the client 112 executed on the desktop PC 108, described above. The laptop 126 has an integrated display, and may also have an integrated microphone and speakers (although these could also be separate from the laptop 126).

Note that the devices 104 used by User A 102 may all be located in the same premises, or may be geographically separated. For example, desktop PC 108 can be User A's work computer (located in his office) and wifi phone 116 and laptop 126 can be located at User A's home.

Figure 2:
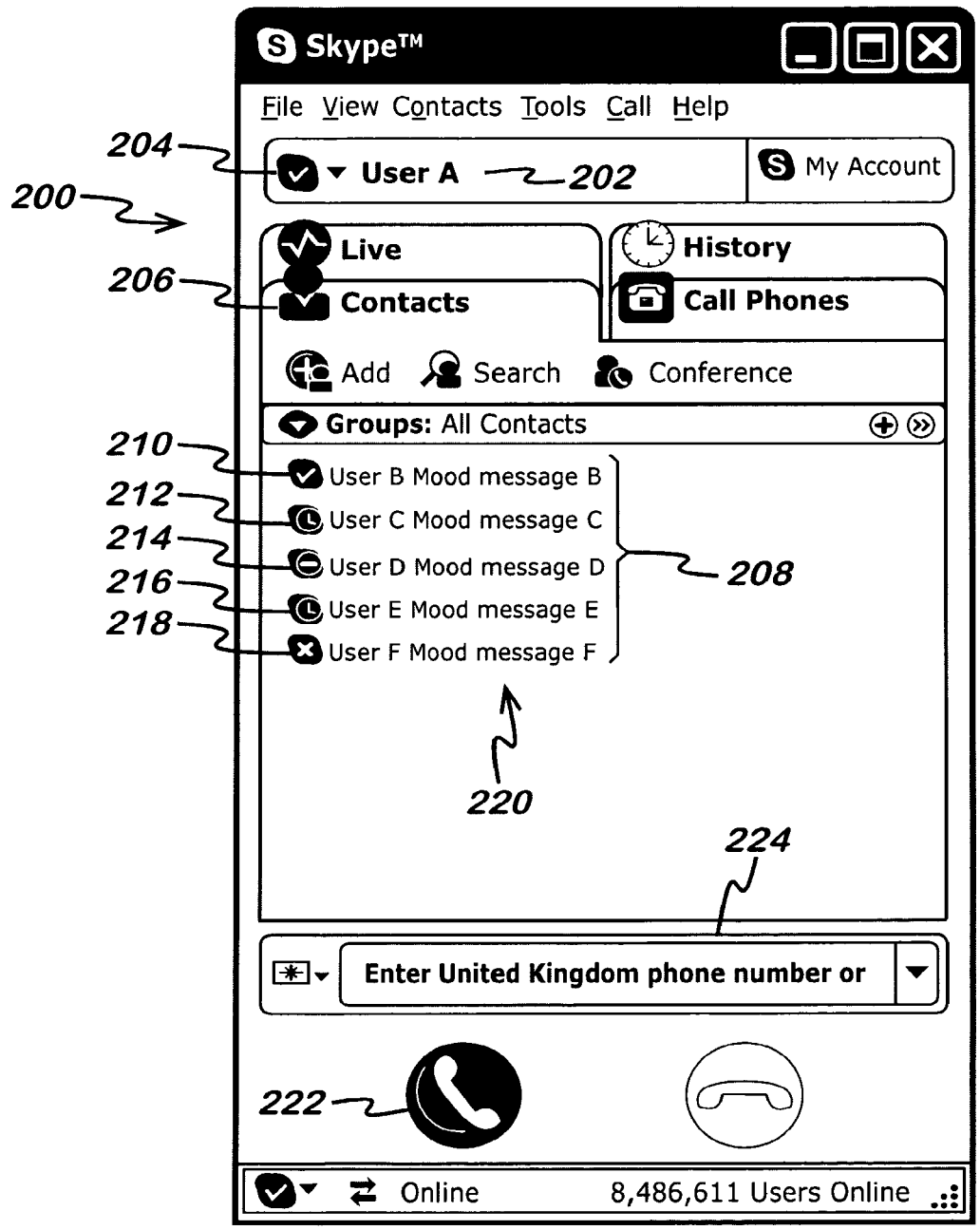
FIG. 2 shows an example user interface for a VoIP client.

An example of a user interface 200 for the clients (112, 118, 128) executed on each of the devices 104 of User A 102 is shown illustrated in FIG. 2. Note that the precise look and layout of the user interface 200 may change depending on device, due to factors such as screen size and device capabilities. Nevertheless, the information displayed in the user interface is generally the same for all devices.

The client user interface 200 displays the username 202 of User A 102 in the P2P system, and User A can manually set his own presence state for this device by using a drop down list by selecting icon 204.

The client user interface 200 comprises a tab 206 labelled "contacts", and when this tab is selected the contacts stored by the user in a contact list are displayed. In the example user interface in FIG. 2, five contacts of other users of the P2P system (User B to F) are shown listed in contact list 208. Each of these contacts have authorised the user of the client 106 to view their contact details and online presence and mood message information. Each contact in the contact list has a presence status icon associated with it. For example, the presence status icon for User B 210 indicates that User B is "online", the presence icon for User C 212 indicates that User C is "not available", the presence icon for User D 214 indicates that User D's state is "do not disturb", the presence icon for User E 216 indicates User E is "away", and the presence icon for User F 218 indicates that User F is "offline". Further presence indications can also be included, as will be described in more detail hereinafter. Next to the names of the contacts in contact list 208 are mood messages 220 of the contacts.

Figure 3:
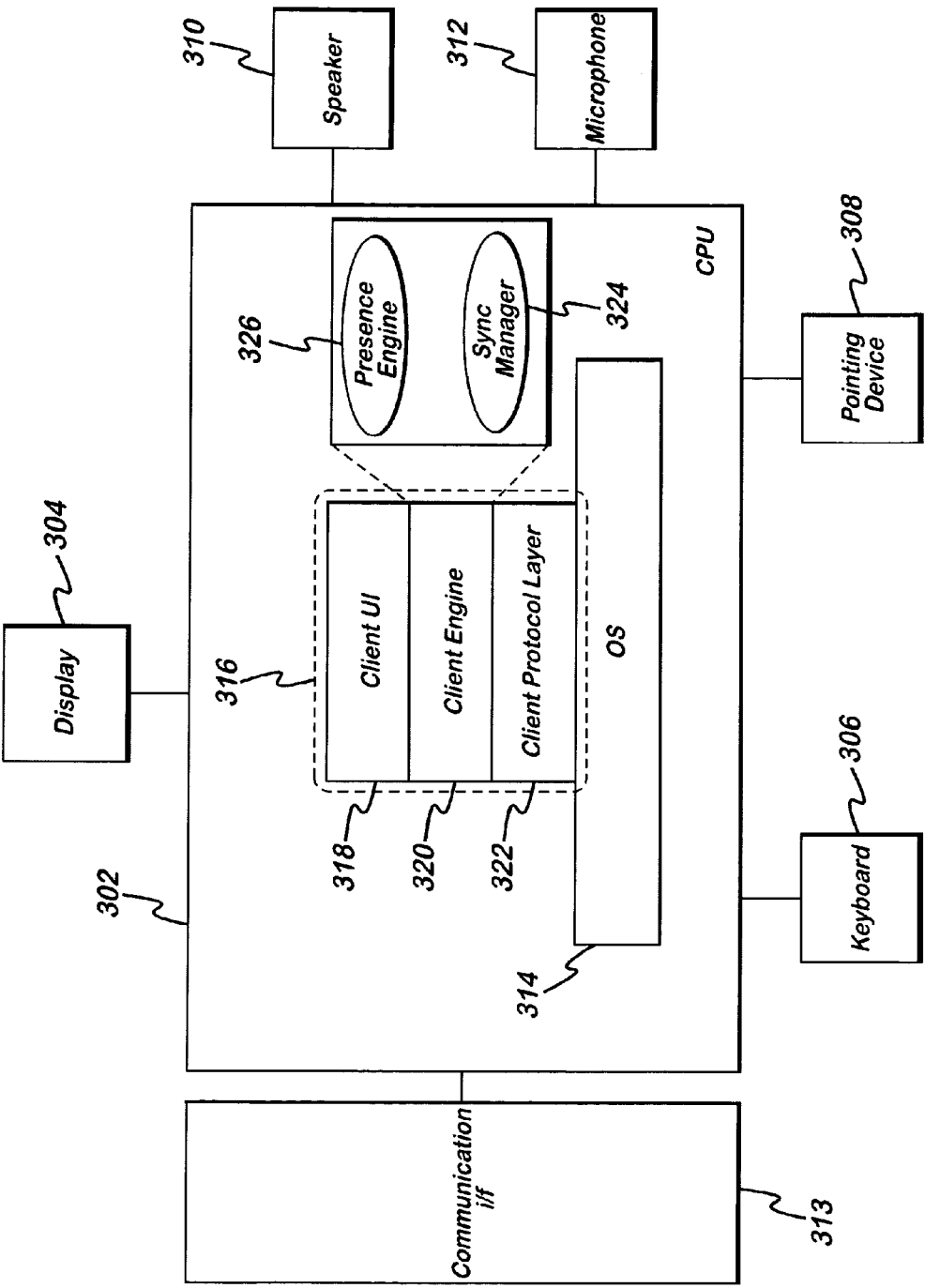
FIG. 3 shows a detailed view of a user terminal.

FIG. 3 illustrates a detailed view of a typical user device (such as desktop PC 108, wifi phone 116 or laptop 126) on which is executed a client (112, 118, 128). The user device comprises a central processing unit ("CPU") 302, to which is connected a display 304 such as a screen, an input device such as a keyboard 306, a pointing device 308 (such as a mouse, joystick or directional pad), a speaker 310 and a microphone 312. The CPU 302 is connected to a communication interface 313, which allows the device to connect to the network 106. The communication interface 313 can provide a wireless or wired connection.

FIG. 3 also illustrates an operating system ("OS") 314 executed on the CPU 302. Running on top of the OS 314 is a software stack 316 for the client (112, 118, 128). The software stack shows a client user interface ("UI") layer 318, a client engine layer 320, and a protocol layer 322. Each layer is responsible for specific functions. Because each layer usually communicates with two other layers only, they are regarded as being arranged in a stack as shown in FIG. 3. The operating system 314 manages the hardware resources of the device and handles data being transmitted to and from the network via the communication interface 313. The client protocol layer 322 of the client software communicates with the operating system 314 and manages the network connections over the P2P system. Processes requiring higher level processing are passed to the client engine layer 320, which handles the processing required for the user to make and receive calls over the P2P system. The client engine 320 also communicates with the user client user interface layer 318. The client engine 320 may be arranged to control the client user interface layer 318 to present information to the user via the user interface of the client (as shown in FIG. 2) and to receive information from the user via the user interface.

The client engine layer 320 comprises two functional blocks that are used for managing presence information between multiple devices. The first of these is a synchronisation manager 324, and the second of these is a presence engine 326. These functional blocks will be described in more detail hereinafter.

Reference is once again made to FIG. 1, and the process for User A to authenticate with the P2P system and initiate a call with another user (called User B) will now be described. In this example, User A is making a call using the desktop PC 108 to User B 132.

As mentioned, the clients of User A's devices are provided with a digital certificate ("UIC") when User A 102 registers with the P2P system, and communication can subsequently be set up and routed between users of the P2P without the further use of a central server. Furthermore, subsequent to the initial registration with the P2P system, the User A must also provide a username and password in order to log-in to the P2P system and view their contact list and make calls. In the case of the desktop PC 108 in this example, this is performed by User A entering his username and password into the client 112 running on the desktop PC 108, and the username and password is then authenticated with an authentication server (not shown). Alternatively, these authentication details may be stored by the client, so that the user does not need to manually enter them every time the client is executed, but the stored details are still passed to the authentication server to be authenticated.

The contact list for the users (e.g. the contact list 208 for User A) is stored in a contact server 130 shown in FIG. 1. When the clients (112) logs into the P2P network the contact server 130 is contacted, and the contact list is downloaded to the desktop PC 108. This allows the user to log into the P2P network from any device and still access the same contact list.

The clients also periodically communicate with the contact server 130 in order to obtain any changes to the information on the contacts in the contact list, or to update the stored contact list with any new contacts that have been added. Presence information is not stored centrally in the contact server. Rather, the clients periodically request the presence information for each of the contacts in the contact list 208 directly over the P2P network.

Calls to the P2P users in the contact list may be initiated over the P2P system by selecting the contact listed in the client user interface 200 and clicking on a "call" button 222 (as shown in FIG. 2) using the pointing device 308. Alternatively, the call may be initiated by typing in the P2P identity of a contact in the field 224. The call set-up is performed using proprietary protocols, and the route over the network 106 between the calling user and called user is determined by the peer-to-peer system without the use of central servers. In FIG. 1, an illustrative route is shown between the caller, User A (102), and the called party, User B (132), via other peers (134, 136, 138, 140) of the P2P system. It will be understood that these peers are merely an illustrative example, and that the call may be routed via fewer or more peers.

Following authentication through the presentation of the digital certificates (to prove that the users are genuine subscribers of the P2P system—described in more detail in WO 2005/009019), the call can be made using VoIP. The client 112 performs the encoding and decoding of VoIP packets. VoIP packets from the desktop PC 108 are transmitted into the Internet 106 via the network interface 110, and routed by the P2P system to all the devices that User B 132 is logged in with. For example, if User B 132 is only logged into the P2P system with a single device, a desktop PC 142, then the call is routed to the desktop PC 142 of User B 132, via a network interface 144. A client 146 (similar to the client 112) running on the desktop PC 142 of User B 132 decodes the VoIP packets to produce an audio signal that can be heard by User B 132 using the handset 148. Conversely, when User B 132 talks into handset 148, the client 146 executed on desktop PC 142 encodes the audio signals into VoIP packets and transmits them across the Internet 106 to the desktop PC 108 of User A 102. The client 112 executed on desktop PC 108 decodes the VoIP packets from User B 132, and produces an audio signal that can be heard by User A 102 using handset 114.

The VoIP packets for the P2P call described above are passed across the Internet 106 only, and the public switched telephone network ("PSTN") is not involved. Furthermore, due to the P2P nature of the network, the actual voice calls between users of the P2P network can be made with no central servers being used (central servers are only required at initial registration and authentication, and to maintain a central contact list). This has the advantages that the network scales easily and maintains a high voice quality, and the call can be made free to the users.

In common with User A 102, User B 132 may also use a number of devices to log into the P2P system. For example, User B 132 may also use a corded telephone 150 with an embedded client 152, which is shown connected to the same network interface 144 as the desktop PC 142. Furthermore, in the example shown in FIG. 1, User B 132 also uses a laptop 154, which is running a client 156 and is connected to the network 106 via a network interface 158. If some or all of these devices are logged into the P2P system, then, when a call arrives from User A 102, all of the logged-in devices ring until one of them is answered by User B 132.

It will be appreciated that the precise devices and configuration shown in FIG. 1 is merely an example scenario, and that the users may have more of fewer devices in a different configuration.

The problem with having multiple devices logged into the P2P system is that the client running in each of the devices may have a different presence status. Therefore, there is no single, unified presence state for a remote user who is viewing User A's presence to display. This problem is illustrated with reference to FIG. 4. FIG. 4 shows an example scenario for the three devices of User A 102—the desktop PC 108, the wifi phone 116, and the laptop 126. Initially, at time t=0, all the devices are offline (i.e. not logged into the P2P system). Then at t=1 User A logs into the P2P system using the desktop PC 108, and hence the presence state in the client 112 of the desktop PC 108 is "online". At this point, this is the only device of User A 102 logged into the P2P system (and hence only one presence state), and therefore to a remote user (e.g. User B 132) there is no problem with viewing User A's presence.

At time t=2, User A 102 logs into the P2P system with the wifi phone 116, and the client 118 executed at the wifi phone also has a presence of "online". Therefore, at t=2, two devices are logged into the P2P system for User A, and both are showing an "online" status. At t=3, the desktop PC 108 has been idle for some time, and an automatic timer in the client 112 detects this and automatically puts the presence status to "away". At this point, there is now a conflict between the presence states of the devices, as the wifi phone 116 shows "online", and the desktop PC 108 shows "away". In this situation, it is uncertain which presence state should be displayed to a remote user.

For example, if User B 132 has User A 102 in his contact list, then the client at User B's device will periodically poll User A 102 to determine his presence state. If the presence state displayed is the presence state that was most recently reported to User B, then it could be either "away" or "online" depending on which device of User A 102 responded first. Furthermore, the presence state may even alternate between polls, as a different device may report each time. This is clearly undesirable behaviour.

The situation becomes even more complex by t=5 in FIG. 4, as User A has now manually set his wifi phone 116 to "do not disturb" ("DND") (at t=4), and has subsequently logged into the laptop 126. There are now three devices, each with a different presence state. This situation of different presence states on different devices will continue until User A either manually sets all of his devices to the same presence state, or logs out of all but one of this devices.

The above-described problem is solved by the use of the two functional blocks mentioned with regards to FIG. 3—the synchronisation manager 324 and the presence engine 326.

The synchronisation manager 324 is a functional block that exists in each of the clients running on each device (as indicated in FIG. 3). The purpose of the synchronisation manager 324 is to determine whether there are other clients running on other devices that are logged into the P2P system with the same username. In other words, for a given client that a particular user has logged in with, the synchronisation manager 324 determines if there are other instances of clients also operating in the P2P system for that same user. Therefore, in the example in FIG. 1, the synchronisation manager in the client 112 of the desktop PC 108 determines that there are another two instances active for User A (the wifi phone 116 and laptop 126). Similarly, the synchronisation manager in the client 118 of the wifi phone 116 determines that User A 102 is also logged in using the desktop PC 108 and the laptop 126. Likewise, the synchronisation manager in the client 128 of the laptop 126 determines that User A 102 is also logged in using the desktop PC 108 and the wifi phone 116.

In addition to determining whether there are any other instances of clients logged in with the same username, the synchronisation manager 324 can preferably also determine the capabilities of the other instances.

The synchronisation manager 324 determines the information about other instances by periodically polling the P2P system for information about the specific username in question.

Once the synchronisation manager 324 has discovered the information about the other instances, then communication can be established between the instances, in order to share information. In particular, information regarding the presence states can be distributed to all the instances of a client logged in with a particular username. Specifically, the synchronisation manager periodically sends presence information to all other instances that it has discovered, as will be described in more detail hereinafter.

It is the function of the presence engine 326 to monitor the presence state of a client and maintain an accurate record of what the presence of the device is, and where that presence originated from. Furthermore, the presence engine 326 receives updates from other instances, and decides how to react to them.

More specifically, the function of the presence engine 326 and synchronisation manager 324 can be summarised as a four step process, as illustrated by the flowchart in FIG. 5. In step S502, the presence engine 326 maintains a record of the presence state of the client, which includes the reason or source of the change in presence. This can be a manual presence change, an automatic presence change, or a retrieved saved presence. This will be described in more detail with reference to FIGS. 6A-C, below.

The presence state information is distributed to all the instances that the synchronisation manager 324 has discovered in step S504. This is illustrated in more detail in FIG. 7A.

In step S506, the presence engines 326 in all the other instances receive the information about the change in presence that was distributed in step S504. Responsive to receiving the information about the change in presence in another instance (from S504), each of the remaining presence engines 326 (each associated with a different device) analyses the information and determines whether to synchronise its own presence state with the new presence state that has changed in the other instance. This process is described in more detail with reference to FIG. 7B, hereinbelow. In particular, in step S506, the source of the presence change is used to determine whether to synchronise the presence states.

Finally, in step S508, the presence engine 326 in a remote device (of another user of the P2P system, e.g. User B 132) must decide on a single, unified visible presence state that is to be displayed for the user with the multiple devices (e.g. User A 102). This process is described in more detail in FIG. 8, hereinafter.

Figure 6A:
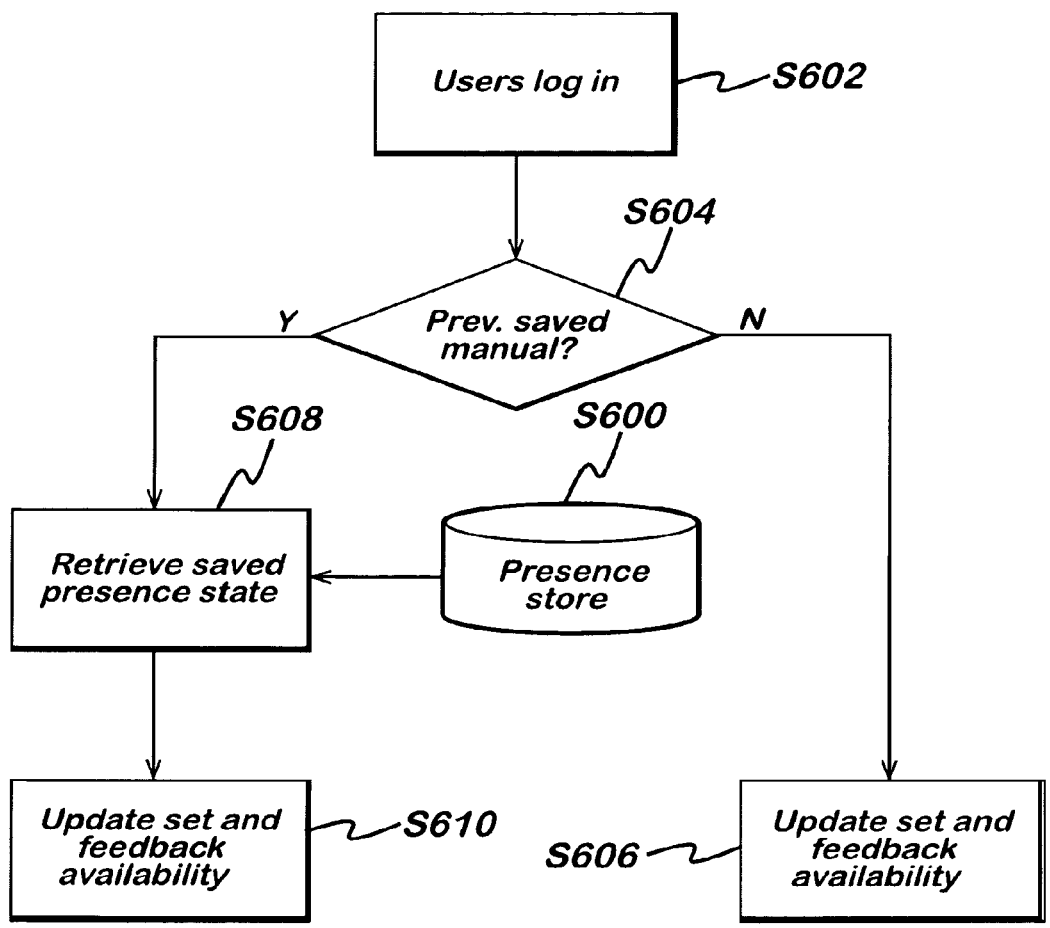
Figure 6C:
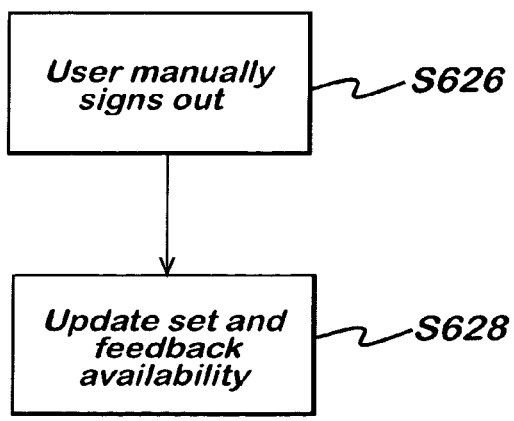
FIG. 6C shows a flowchart for maintaining presence information following a manual log-off.

Reference is now made to FIGS. 6A to 6C, which illustrate in more detail the process of S502 in FIG. 5. As mentioned, the purpose of this process is to maintain the presence and the reason for any changes.

The presence state information is maintained by storing four items of data. The presence engine 326 maintains two separate presence state variables. The first of these is called a "set availability" state. This stores the presence state that has been set by the user of the device. The second is called a "feedback availability" state. This stores a presence state that is actually displayed to the user of the device. This is useful in the case that the presence state that is displayed in the UI of the client is different to that set by the user. A simple example of this is when the user has selected a presence state, but the client is still attempting to connect to the P2P system, as in this case the "set availability" is the presence state selected by the user, but the "feedback availability" shows a status of "connecting" in the UI of the client. The third data item stored is a single bit that indicates whether the presence stored in the "set availability" was changed by the user during the current session—i.e. whether it was set manually by the user, or retrieved from a saved presence state from a previous session. The fourth data item is a timestamp for the time that the presence state for the "set availability" was recorded.

The presence engine can use the above information to determine the origin or source of a presence state. For example, if the change is a result of the user manually changing the presence (e.g. by using drop-down list 204 in FIG. 2), then this is said to be a manual presence change. If the change in presence is a result of the client deciding to change the presence itself (e.g. changing the presence to "away" or "not available" due to inactivity at the device), then this is said to be an automatic change.

Reference is first made to FIG. 6A, which illustrates the process for setting the presence when a user logs into the P2P system using a device. In step S602, the user logs into the P2P system with a device (e.g. any one of the devices 104 of User A 102). In step S604, the presence engine 326 checks whether there is a previously saved presence state for this device.

Saved presence states are advantageous because a user may deliberately set a particular state (for example "do not disturb"), but may subsequently be disconnected from the network (e.g. does to loss of a wifi connection). The saving of any manually set presence state allows this state to be recovered when the user comes back online again. If the presence state was not saved, then the user would come back with the presence "online" and not "do not disturb", which could result in the user being contacted by other users, even though he had previously explicitly set his presence to "do not disturb".

If, in step S604, it is determined that there is not a previously saved manual presence state, then the user is logged onto the network with the default presence (e.g. "online"), and this presence state is stored in both the "set availability" and "feedback availability" variables in step S606.

If, in step S604, it is determined that there is a previously saved manual presence state, then this is retrieved from the presence store 600 in step S608, and the saved presence state is set as the new presence for this device. Specifically, the retrieved saved presence state is stored in both the "set availability" and "feedback availability" variables in step S610.

Reference is now made to FIG. 6B, which illustrates a flowchart for the process for updating the presence information in the case that there is a change in the presence state of a device.

In step S612, the presence engine 326 for a particular client detects a change in the presence state for the device. For example, with reference to FIG. 1, the presence engine in the client 112 in the desktop PC 108 may detect that the presence state on the desktop PC 108 has changed.

At step S614, the presence engine 326 determines if the source of the change was an automatic or manual change. If it was an automatic change, then, in step S616, the new presence is recorded in the "feedback availability" variable only (and not the "set availability"). The reason for this is that the user has not actively set this presence state (hence it is not stored in the "set availability"), but the new presence state is displayed to the user in the UI of the client (hence setting the "feedback availability"). The fact that the "set availability" and "feedback availability" are now set to different values can be exploited to determine the origin of the presence change as automatic, as described later.

If S614 determines that this was a manual change, then in step S618 the presence engine stores the manual change in presence state in both the "set availability" and "feedback availability" variables. In step S620, the manual change in presence state is also stored in the presence store 600. The presence store 600 is persistent storage, such that, if the user is disconnected or logged off from the P2P system, then the manually-set presence state can be retrieved (as in S608 of FIG. 6A). In step S622, a bit is set to indicate that the value stored in the "set availability" variable has been changed manually by the user during the current session. The use of this bit will be described in more detail hereinafter. Finally, in step S624, a timestamp for the manual change in presence is recorded.

Reference is now made to FIG. 6C, in which is illustrated a flowchart for maintaining the presence after a manual sign-out from the system. In step S626, the user manually selects to sign-out from the system. In step S628, both the "set availability" and "feedback availability" variables record the new presence state (which is "offline").

In further embodiments, the process in FIG. 6C can include further steps (not illustrated), whereby if the user manually signs-out of one device, he is promoted with a question as to whether he wishes to sign out of all the devices he has that are active. If he chooses to do this, then messages are sent to all the devices by the synchronisation manager, instructing the devices to log-off from the P2P system.

As a result of the information maintained through the flowcharts of FIGS. 6A to 6C, the origin or source of a presence state can be readily determined. For example, when the "feedback availability" and "set availability" variables differ, then the origin is an "automatic" change in presence. When the bit indicating a presence change during a session is not set, then this means that the "set availability" has not been changed during this session, thereby indicating that the origin is a "saved" presence state (i.e. carried over from a previous session) or a new log-in (this is because this bit is only set in step S622 of FIG. 6B, and not in FIG. 6A). Otherwise, if the above conditions are not met, the origin is a "manual" change in presence.

Figure 7A:
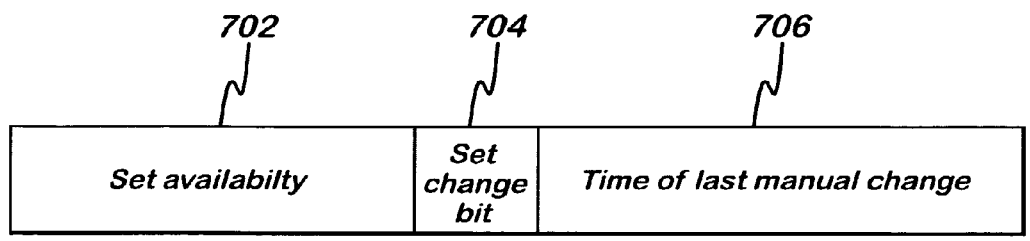
FIG. 7A shows a structure for a message containing presence information.

Reference is now made to FIG. 7A, which illustrates an example of the content of the messages periodically transmitted by the synchronisation manager 324 to other instances from a device, as shown in step S504 of FIG. 5. Note that this is merely an example, and the precise structure and content of the message can be different in different embodiments.

The first part 702 of the message contains the value of the presence stored in the "set availability" variable. The second part 704 of the message contains the value of the bit indicating whether there has been a presence change during this session. The third part 706 of the message includes the timestamp (if any) of a manual change in presence (set in S624).

The information contained in this message is sufficient for the other instances to determine how to react to a particular presence state change in the devices.

Note that the "feedback availability" does not need to be transmitted to the other instances. This is because the "feedback availability" and "set availability" will only differ as a result of an automatic change. An automatic change in presence is not synchronised across all devices (e.g. the desktop PC 108 changing to an "away" state due to being idle does not change the presence states of the wifi phone 116 and laptop 126). Therefore, the other instances do not need to be informed of automatic changes, and hence why the "feedback availability" does not need to be sent to the other instances.

Figure 7B:
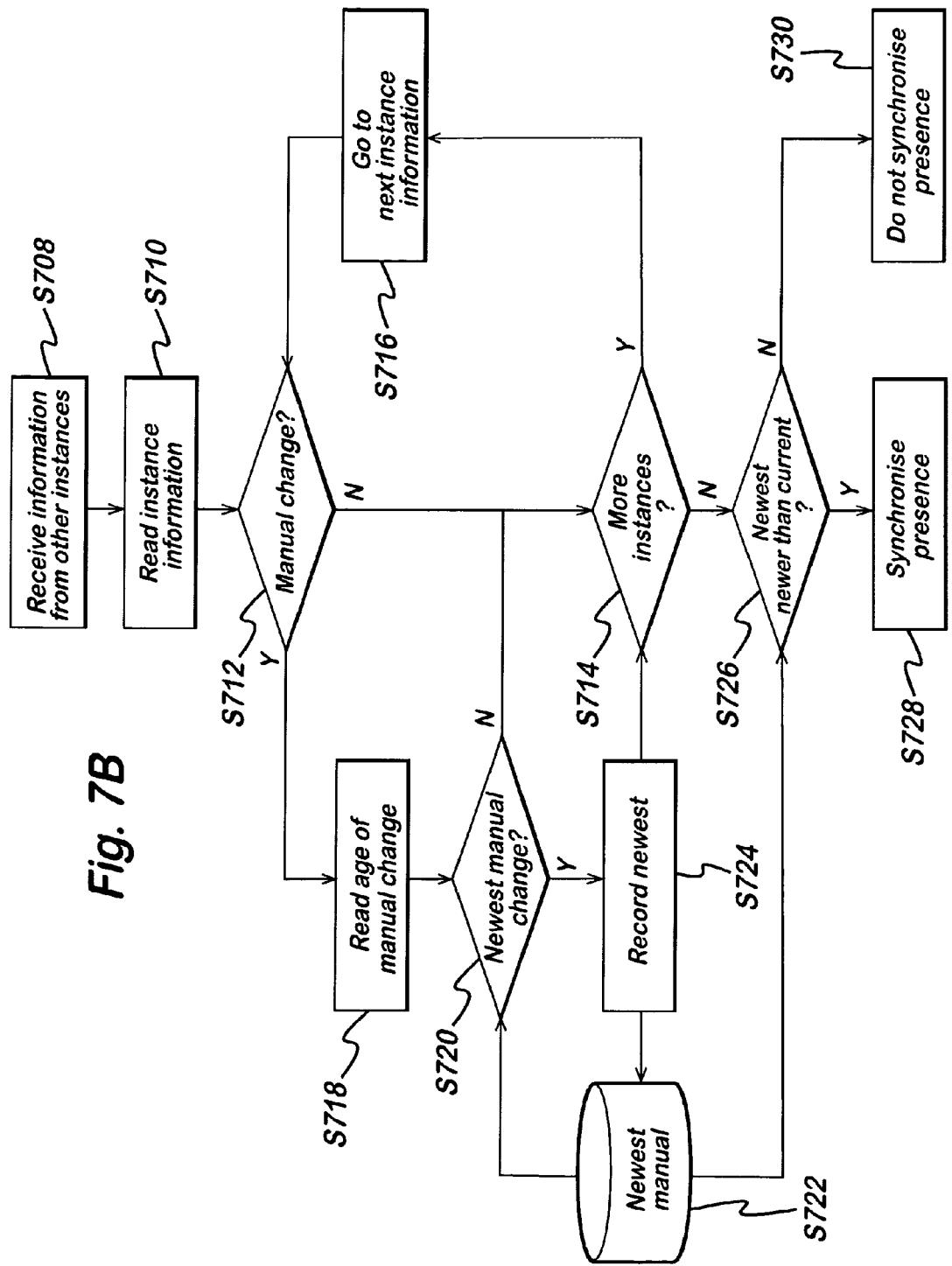
FIG. 7B shows a flowchart for determining whether to synchronise a device presence state with another device.

Reference is now made to FIG. 7B, which illustrates in more detail the process of S506 from FIG. 5. This process is performed by the presence engine 326 of a client in response to receiving the presence information from other instances (as contained in the message in FIG. 7A). For example, referring to FIG. 1, if the presence is changed on the desktop PC 108, then this change will be reported to the other instances (the wifi phone 116 and the laptop 126) in a similar message to that shown in FIG. 7A. The process described below with reference to FIG. 7B is then performed in each of the instances receiving the presence information—i.e. the wifi phone 116 and the laptop 126.

In step S708, the presence engine 326 in a client receives presence information messages from the other instances, and compiles these for comparison. In step S710, the presence engine 326 reads the presence information for the first instance.

In step S712, the bit indicating a change during the current session (704) is read. If this bit is not set, then this indicates that the "set availability" comes from a saved presence or new log-in. These presence states are not synchronised between devices. In this case, in S714 the presence engine checks if there is information from other instances to read, and if so reads the information from the next instance in S716.

Returning again to S712, if the bit has been set, then this indicates a manual change in presence in this session. In this case, the timestamp of the manual change (706) is read in step S718. This is compared to the newest known manual change in step S720, which is stored in store 722 (which is obviously initialised to a null time value before the algorithm is run).

If the timestamp of the manual change is not the newest read so far, then in step S714 the presence engine checks if there is information from other instances to read, and if so reads the information from the next instance in S716. If, however, the timestamp of the manual change is the newest read so far, then in step S724 this newest value is written to the store (overwriting any previous value). Step S714 is then returned to, wherein the presence engine checks if there is information from other instances to read, and if so reads the information from the next instance in S716.

Once all information from all the instances has been read, then the process will return to step S714, but the presence engine will determine that there is no more information from other instances to consider. The process will then move to step S726, wherein the newest manual change from all the instances (stored in 722) is read, and compared to the timestamp of any manual change on the current device (i.e. the device on which the algorithm is being run).

If, in step S726, it is found that a manual change on another instance was made more recently than on the current device, then the presence of the current device is synchronised (in step S728) to the presence of the instance with the more recent manually-set presence.

Conversely, if in step S726 it is found that a manual change on the current device was made more recently than any made on the other instances, then the presence is not synchronised in step S730.

When a device synchronises with the presence state of another instance (as in S728), this is stored in the "set availability" and "feedback availability" variables of the current device.

After the process in FIG. 7B has been performed, each active instance has been informed of a change in presence on one device, and each individual instance has decided whether or not to synchronise its own presence in response to this change. However, there still exists the problem that the different instances can have different presences. Therefore, there is a need to calculate what the single presence state will be that is shown to the other users of the P2P system. The process for determining this presence is illustrated in FIG. 8.

Figure 8:
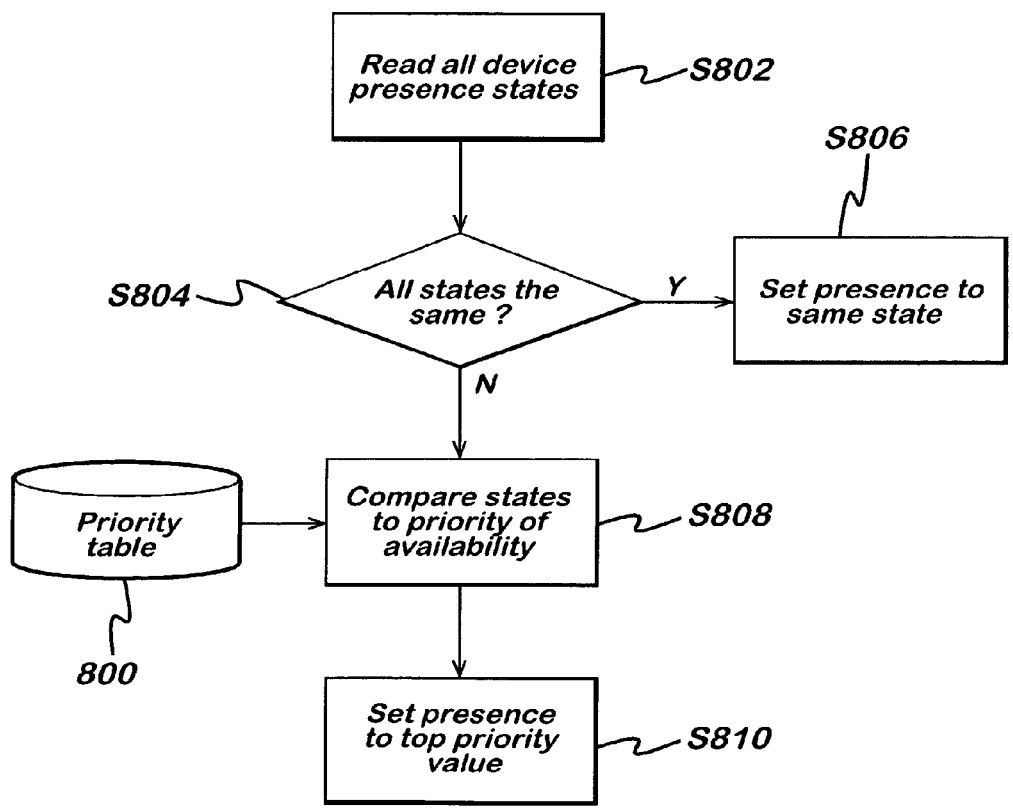
FIG. 8 shows a flowchart for determining the overall presence state to display for a user.

FIG. 8 shows in more detail the process in step S508 of FIG. 5. The process in FIG. 8 is performed in the presence engine 326 of a remote user. For example, referring again to FIG. 1, the three devices (112, 116, 126) of User A 102 can each have different presence states following the process in FIG. 7B. Therefore, the client 146 of User B 132 (who has User A 102 in his contact list) must determine which of these presence states are to be displayed in the UI of the client 146 to User B.

In step S802 of FIG. 8, the presence engine 326 of the remote user's client (e.g. client 146 of User B) reads the presence states of all the instances for his contact (e.g. by polling all the devices 104 of User A 102). The devices being polled report their "feedback availability" value to the remote user, and not their "set availability"—this is because the algorithm in FIG. 8 needs to know of any automatically set presence states.

Once the "feedback availability" presence states for all the instances have been read, it is checked in S804 whether the presence states are all the same. This situation can frequently occur due to the user setting a manual presence state, which is synchronised over all the devices (see S728 in FIG. 7B). If the presence states in each of the instances are all the same, then in step S806 the presence state for the user (that will be displayed in the remote user's client) is set to the presence state that all the instances have in common.

If the presence states in all the instances are not found to be the same in S804, then, in step S808, the presence states of the devices are compared to a priority list stored in table 800. In preferred embodiments, the list is ordered according to a "priority of availability". For example, seven presence states are shown below according to an example priority of availability:

1. Do not disturb
2. SkypeMe™
3. Online
4. Away
5. Not available
6. Invisible
7. Offline Obviously, in alternative embodiments, the precise selection of the order of the presence states in the priority list could be different, and a different number of presence states can be included.

After the presence states in all the instances are compared to the priority table, then in step S810 the presence state that is highest in the list is selected as the visible presence state for the user. This presence state is then displayed in the client of the remote user.

Reference is now made to FIG. 9, which illustrates the same example scenario as described above with reference to FIG. 4, but in this case the processes described in FIGS. 5 to 8 are utilised to manage the presence over the multiple devices. At time t=0, all the devices are offline (i.e. not logged into the P2P system). Therefore, the presence that is externally visible (to a remote user) for User A 102 (as shown on axis 902) is "offline". At time t=1 User A logs into the P2P system using the desktop PC 108, and hence the presence state in the client 112 of the desktop PC 108 is "online". At this point, this is the only device of User A 102 logged into the P2P system (and hence only one presence state), and therefore to a remote user (e.g. User B 132) the externally visible presence 902 is "online".

At time t=2, User A 102 logs into the P2P system with the wifi phone 116, and the client 118 executed at the wifi phone also has a presence of "online". The wifi phone 116 coming online does not cause a change in the status of the desktop PC 108, as this has the same presence state. The externally visible presence remains as "online" (see S804 and S806 of FIG. 8).

At t=3, the desktop PC 108 has been idle for some time, and an automatic timer in the client 112 detects this and automatically puts the presence status to "away". The automatic presence change is not reported to the wifi phone 116 (as it is only recorded as "feedback availability"). Hence, the wifi phone does not synchronise its presence to the "away" status, as it is a result of an automatic change. The externally visible presence is decided according to FIG. 8. In this case the desktop PC 108 has a presence of "away" and the wifi phone is "online". According to the priority of availability list shown above (which is used in this example) the highest rated presence on the devices is the "online" status of the wifi phone 116, and this is therefore maintained as the externally visible presence 902.

At t=4 User A 102 sets the status of the wifi phone 116 manually to DND. As this is a manual change, the message (as in FIG. 7A) to the desktop PC 108 will reflect this change, and the desktop PC synchronises its presence to this manually changed setting as it is newer than any manual change on the desktop PC 108 (see FIG. 7B). Therefore, the desktop PC presence now shows DND. Consequently, the presence settings of all the active devices are the same, and the externally visible presence 902 is also DND.

At time t=5 in FIG. 4, User A has logged into the laptop 126, and there are now three active devices. The new log-in results in the laptop presence initially being "online", which is reported to the wifi phone 116 and desktop PC 108. However, this new log-in does not override the presence at the desktop PC 108 and wifi phone 116, because the bit (704) is not set (hence not a manual change in S712 of FIG. 7B). Therefore, the presence states at the desktop PC 108 and wifi phone 116 remain unchanged. Furthermore, the laptop 126 will also receive presence information from the wifi phone 116 and desktop PC 108, which indicates the manually set DND presence. This therefore results in the laptop 126 synchronising with the DND presence. The presence states for all devices is therefore DND, and the presence displayed at the remote user remains as DND.

At t=6, the laptop 126 has been idle, and automatically changes to "not available". As this is an automatic change, this is not synchronised on the wifi phone 116 and desktop PC 108. The externally visible presence 902 remains as DND, as this is a higher rated presence than "not available".

At time t=7 the wifi phone 116 goes offline. For example, User A 102 may have moved such that the wifi connection has been lost. The externally visible presence does not change (as DND is a higher priority than offline). However, when the wifi phone 116 regains a connection, and comes back online (e.g. if User A 102 moves into a region with wifi coverage) at t=8, the previously saved presence setting of DND is restored. The externally visible presence remains as DND, as all instances have this same presence state.

At t=9, the desktop PC 108 is manually changed from DND to "online" by User A 102. As this is a manual change, it is reported to all instances (S614). Both the wifi phone 116 and laptop 126 synchronise to this new manually set presence (S722), and the externally visible presence 902 displayed to a remote user is changed to "online", as all the instances share this new presence setting (S806).

Therefore, it can be seen that the technique presented hereinbefore solves the problem of providing a single unified presence setting when a user is logged-in from multiple devices. In particular, by considering both the source of the presence and the priority of availability, the technique ensures that the presence that is displayed to remote users reflects as accurately as possible the user's intended behaviour.

In addition, in further embodiments, the presence state displayed to other users of the P2P system can also provide information regarding the type of device that the user is using. This functionality is illustrated with reference to FIG. 10. The standard presence icon (in this case indicating "online") is shown at 1002. This is the same as the presence icons 204 and 210 in FIG. 2. Similar icons are also shown for the other presence states (as described above with reference to FIG. 2). However, these icons do not give any indication of the type of device that is being used. This problem is solved by the use of an icon such as that shown at 1004 of FIG. 10. This is a device indicator icon, which can be used to indicate in the presence state that the user is using a particular type of device. The example device indicator icon illustrated in FIG. 10 is the icon representing an "online" presence for a mobile device. Similar icons can also be used to indicate the other types of devices, and different presence states for these devices.

When device indicator presence icons are available, a decision process is needed to decide when they are to be displayed to other users of the P2P system, as described below. In the example below, the device indicator indicates the user of a mobile device, as in FIG. 10. The device indicator could indicate different types of devices in different embodiments.

If a user is logged into the P2P system on a single mobile device, then a device indicator icon is used to display the user's presence on this type of device. For example, if User A 102 is logged-in using only the wifi phone 116, then the presence status that is shown to other users is displayed using mobile device indicator presence icons as in 1004. Similarly, if a user is logged in with multiple devices, and all of these are mobile devices that support the same device indicators, then the presence can be displayed using these device indicator icons.

However, if a user is logged in using multiple devices and there is at least one device which is not a mobile device, then the device indicator presence icons should not necessarily be displayed. Whether or not the device indicator presence icons should be displayed depends upon which device is providing the presence that has the highest rating in the priority of availability table (see FIG. 8). For example, if User A 102 is logged in using the desktop PC 108 and wifi phone 116, and both of the devices are "online", then the presence is shown with the standard (non-mobile) icon (1002 in FIG. 10). However, if the non-mobile device (i.e. desktop PC 108) status drops automatically to "away" or "not available", then the externally visible presence comes from the wifi phone (which is still "online") as this has a higher rated priority of availability. As the externally visible presence comes from a mobile device (the wifi phone 116) the presence is displayed using the mobile device indicator icon 1004.

While this invention has been particularly shown and described with reference to preferred embodiments, it will be understood to those skilled in the art that various changes in form and detail may be made without departing from the scope of the invention as defined by the appendant claims.

What is claimed is:

1. A system for determining an overall presence state for a user using a plurality of user devices connected to a network, each of the user devices storing in a user device memory of the respective user device an overall presence state for the user, comprising:
- a detector in each of the plurality of user devices for detecting a change in a presence state in at least one of said plurality of user devices;
- a transmitter in each of the plurality of user devices for transmitting, from at least one of said plurality of user devices, a message via the network to at least some other of said plurality of user devices, said message comprising the presence state effective to enable said at least some other of said plurality of user devices to each determine whether to synchronise their associated presence state with that of said at least one of the plurality of user devices;
- a receiver in each of the plurality of user devices for receiving other messages, containing presence state, from said at least some other of said plurality of user devices at said at least one of the plurality of user devices; and
- a processor for executing a decision-making code sequence in a processor of said at least one of said plurality of user devices to:
  - collate a list of presence states from the plurality of user devices;
  - compare the presence states in the list to a predetermined ranking;
  - select a highest ranked presence state as the overall presence state for said user; and
  - determine whether to synchronise the presence state of said at least one user device with the presence state from at least one of said other messages based on an origin of an event causing the change in presence state at said at least some other of said plurality of user devices, the synchronized presence state reflecting the overall presence state of the user based on the presence states at the plurality of user devices.

2. The system of claim 1, wherein the message further comprises the origin of the event causing the change in the presence state at said at least one of said plurality of user devices.

3. The system of claim 1, wherein the origin of the event causing the change in the presence state at said at least some other of said plurality of user devices is one of an automatic change in presence state, a manual change in presence state, or a retrieval of a saved presence state.

4. The system of claim 3, wherein the decision-making code sequence is arranged to not synchronise the presence state of said at least one user device with the presence state from said at least one of said other messages if the origin of the event causing the change in presence state at said at least some other of said plurality of user devices is the automatic change in presence state, or the retrieval of a saved presence state.

5. The system of claim 3, wherein the automatic change in presence state is caused by the at least some other of said plurality of user devices entering an idle state.

6. The system of claim 3, wherein the decision-making code sequence is arranged to synchronise the presence state of said at least one user device with the presence state from said at least one of said other messages if the origin of the event causing the change in the presence state at said at least some other of said plurality of user devices is a manual change in the presence state that is more recent than a manual change on said at least one user device.

7. The system of claim 6, further comprising memory for storing a timestamp recording a time of the manual change in presence state in the case that the origin of the event causing the change in presence state at said at least some other of said plurality of user devices is the manual change in presence state, and, wherein said at least one other of said other messages further comprises said time stamp.

8. The system of claim 7, wherein said decision-making code sequence is arranged to read said timestamp to determine whether the origin of the event causing the change in the presence state at said at least some other of said plurality of user devices is a manual change in presence state that is more recent than a manual change on said at least one user device.

9. The system of claim 6, further comprising memory for storing a bit indicating the manual change in presence state in the case that the origin of the event causing the change in presence state at said at least some other of said plurality of user devices is the manual change in presence state, and wherein said at least one of said other messages further comprises said bit.

10. The system of claim 9, wherein said decision-making code sequence is arranged to read said bit to determine whether the presence from said at least one of said other messages is the manual change in presence state.

11. The system of claim 1, wherein the network is an Internet Protocol (IP) network.

12. A method for determining an overall presence state for a user using a plurality of user devices connected to a network, each of the user devices storing in a user device memory of the respective user device the overall presence state for the user, the method comprising:
- detecting a change in the presence state in at least one of said plurality of user devices;
- said at least one of the plurality of user devices transmitting a message via the network to at least some other of said plurality of user devices, said message comprising the presence state effective to enable said at least some other of said plurality of user devices to each determine whether to synchronise their associated presence state with that of said at least one of the plurality of user devices;
- receiving other messages, containing presence state, from said at least some other of said plurality of user devices at said at least one of the plurality of user devices;
- collating a list of presence states from the plurality of user devices;
- comparing the presence states in the list to a predetermined ranking;
- selecting a highest ranked presence state as the overall presence state for said user; and
- executing a decision-making code sequence in a processor of said at least one of said plurality of user devices to determine whether to synchronise the presence state of said at least one user device with the presence state from at least one of said other messages based on an origin of an event causing the change in the presence state at said at least some other of said plurality of user devices, the synchronized presence state reflecting the overall presence state of the user based on the presence states at the plurality of user devices.

13. The method of claim 12, wherein the message further comprises the origin of the event causing the change in the presence state at said at least one of said plurality of user devices.

14. The method of claim 12, wherein the origin of the events causing changes in the presence state at said at least some other of said plurality of user devices further comprises one of an automatic change in presence state, a manual change in presence state, or a retrieval of a saved presence state.

15. The method of claim 14, wherein, in the case that the origin of the event causing the change in the presence state at said at least some other of said plurality of user devices is the manual change in presence state, the method further comprises storing a bit indicating the manual change in presence state, and wherein said at least one of said other messages further comprises said bit.

16. The method of claim 15, wherein said decision-making code sequence is arranged to read said bit to determine whether the presence from said at least one of said other messages is the manual change in presence state.

17. The method of claim 14, wherein, in the case that the origin of the event causing the change in the presence state at said at least some other of said plurality of user devices is the manual change in presence state, the method further comprises storing a timestamp recording the time of the manual change in presence state, and wherein said at least one of said other messages further comprises said timestamp.

18. The method of claim 17, wherein said decision-making code sequence is arranged to read said timestamp to determine whether the origin of the event causing the change in the presence state at said at least some other of said plurality of user devices is the manual change in presence state that is more recent than a manual change on said at least one user device.

19. The method of claim 14, wherein the automatic change in presence state is caused by the at least some other of said plurality of user devices entering an idle state.

20. A user device connected to a plurality of other user devices over a network, the user devices associated with a user, and each of the user devices storing an overall presence state for the user, the user device comprising:

a communication interface to connect the user device to the network;

memory for storing the overall presence state;

a detector to detect a change in the presence state in at least one of the plurality of user devices;

a transmitter, using the communication interface, to transmit to at least some other of said plurality of user devices, a message comprising the presence state effective to enable said at least some other of said plurality of user devices to each determine whether to synchronise their associated presence state with the user device;

a receiver to receive other messages, via the communication interface, the other messages containing presence state, from said at least some other of said plurality of user devices; and a processor for executing a decision-making code sequence to determine the overall presence state for the user, the decision-making code sequence configured to:

collate a list of presence states from the plurality of user devices;

compare the presence states in the list to a predetermined ranking;

select a highest ranked presence state as the overall presence state for said user; and determine whether to synchronise the presence state of the user device with the presence state from at least one of said other messages based on an origin of an event causing the change in the presence state at said at least some other of said plurality of user devices, the synchronized presence state reflecting the overall presence state of the user based on the presence states at the plurality of user devices.

\* \* \* \* \*